(12) United States Patent
Irie et al.

(10) Patent No.: US 7,804,311 B2
(45) Date of Patent: Sep. 28, 2010

(54) ELECTRONIC MACHINE, CONNECTED MACHINE IDENTIFYING METHOD FOR ELECTRONIC MACHINE AND CONTROL SYSTEM

(75) Inventors: Kenji Irie, Kanagawa (JP); Ken Tamayama, Tokyo (JP); Hirotaka Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 263 days.

(21) Appl. No.: 11/860,770

(22) Filed: Sep. 25, 2007

(65) Prior Publication Data

US 2008/0246581 A1  Oct. 9, 2008

(30) Foreign Application Priority Data

Oct. 11, 2006  (JP) .............................. 2006-278053

(51) Int. Cl.
  *G01R 27/08* (2006.01)
(52) U.S. Cl. .......................... 324/714; 324/691; 710/15
(58) Field of Classification Search ................. 324/691, 324/714
  See application file for complete search history.

(56) References Cited

U.S. PATENT DOCUMENTS

| | | | | |
|---|---|---|---|---|
| 1,877,570 | A | | 9/1932 | Fitzgerald |
| 2,560,884 | A | | 7/1951 | Nagourney |
| 4,806,852 | A | * | 2/1989 | Swan et al. ................. 324/73.1 |
| 5,845,885 | A | | 12/1998 | Carnevali |
| 5,920,197 | A | * | 7/1999 | Price et al. .................. 324/538 |
| 6,594,366 | B1 | * | 7/2003 | Adams ........................ 381/74 |
| 6,663,064 | B1 | | 12/2003 | Langner et al. |
| 6,988,905 | B2 | * | 1/2006 | Corey et al. ................. 439/222 |
| 7,562,097 | B2 | * | 7/2009 | Shinozaki ................ 707/104.1 |
| 2005/0268000 | A1 | | 12/2005 | Carlson |
| 2006/0011795 | A1 | | 1/2006 | Dobbins |
| 2006/0181241 | A1 | * | 8/2006 | Veselic ........................ 320/107 |
| 2007/0226381 | A1 | * | 9/2007 | Kuan et al. ................... 710/16 |

FOREIGN PATENT DOCUMENTS

| | | |
|---|---|---|
| DE | 20 2006 000 993 U1 | 5/2006 |
| EP | 1 327 387 A1 | 7/2003 |
| JP | 11-230149 | 8/1999 |
| JP | 2000-287800 | 10/2000 |
| JP | 2002-241382 | 8/2002 |
| JP | 2005-006134 | 1/2005 |

* cited by examiner

*Primary Examiner*—Timothy J Dole
*Assistant Examiner*—John Zhu
(74) *Attorney, Agent, or Firm*—Oblon, Spivak, McClelland, Maier & Neustadt, L.L.P.

(57) ABSTRACT

An electronic machine connectable to a different apparatus is disclosed. The electronic machine includes a resistance, a connector to be connected to the different apparatus, and a detecting section that detects one state from multiple states based on the resistance value of the resistance and the resistance value of a resistance included in the different apparatus connected to the connector and controls multiple parameters based on the detected one state.

12 Claims, 13 Drawing Sheets

FIG. 11

| PATTERNS | VOICE | | DCIN CURRENT | MICROPHONE PRIORITY |
|---|---|---|---|---|
| | OUTPUT | VARIABLE | | |
| 1 | HPJ | VARIABLE | 500mA | INTERNAL |
| 2 | MULTI | FIXED | 800mA | INTERNAL |
| 3 | MULTI | VARIABLE | 800mA | INTERNAL |
| 4 | MULTI | VARIABLE | 800mA | EXTERNAL |
| 5 | MULTI | FIXED | 800mA | EXTERNAL |
| 6 | MULTI | VARIABLE | 500mA | INTERNAL |
| 7 | MULTI | FIXED | 500mA | INTERNAL |
| 8 | HPJ | VARIABLE | 500mA | EXTERNAL |
| 9 | MULTI | VARIABLE | 500mA | EXTERNAL |
| 10 | HPJ | VARIABLE | 800mA | EXTERNAL |
| 11 | MULTI | FIXED | 500mA | EXTERNAL |
| 12 | HPJ | VARIABLE | 800mA | INTERNAL |

ELECTRONIC MACHINE, CONNECTED MACHINE IDENTIFYING METHOD FOR ELECTRONIC MACHINE AND CONTROL SYSTEM

CROSS REFERENCES TO RELATED APPLICATIONS

The present invention contains subject matter related to Japanese Patent Applications JP 2006-278053 filed in the Japanese Patent Office on Oct. 11, 2006, the entire contents of which being incorporated herein by reference.

BACKGROUND OF THE INVENTION

1. Field of the Invention

The present invention relates to an electronic machine, a connected machine identifying method and a control system.

2. Description of the Related Art

Some electronic machines such as a portable music player may be configured to accept the connection of an external machine such as a headphone, a speaker and a remote controller (these different machines may be called "accessory" hereinafter). Connecting a different machine, that is, an accessory such as an earphone for enjoying music, a personal computer for transferring data and an AC adapter that drives an electronic machine and/or charges a battery thereof to an electronic machine can improve the convenience in operations of the electronic machine, drive the electronic machine and/or charge the battery built in the electronic machine.

When a different machine is connected to such an electronic machine, the electronic machine may require identifying the connected machine and performing proper processing within the electronic machine based on the identification result. A technology that controls the state of an electronic machine, which accepts the connection of a different machine, within the electronic machine when a different machine is connected thereto is disclosed in, for example, JP-A-2002-7302 (Patent Document 1).

SUMMARY OF THE INVENTION

However, the method disclosed in Patent Document 1 has a problem that the connection state of only one machine can be identified in an electronic machine. Today, many machines connectable to an electronic machine such as a portable music player exist, and many machines such as an earphone among the machines may not have an electronic circuit. An accessory without an electronic circuit such as an earphone may not notify the identity of the machine to the electronic machine side. Even when such an accessory without an electronic circuit is connected to the electronic machine, the electronic machine side may require detecting the identity of the machine accurately. Furthermore, it is important to accurately detect which machine is connected to the electronic machine among multiple machines connectable thereto.

Accordingly, it is desirable to provide an invent and improved electronic machine, connected machine identifying method and control system that can identify a different connected machine based on multiple states.

According to an embodiment of the present invention, there is provided an electronic machine connectable to a different apparatus, the machine including a resistance, a connector to be connected to the different apparatus, and a detecting section that detects one state from multiple states based on the resistance value of the resistance and the resistance value of a resistance included in the different apparatus connected to the connector and controls multiple parameters based on the detected one state.

Under this construction, the connector is connected to a different apparatus, and the detecting section detects one state from multiple states based on the resistance value of the resistance and the resistance value of a resistance included in the different apparatus connected to the connector and controls multiple parameters based on the detected one state. As a result, one state can be detected from multiple states based on the resistance value of the resistance of the electronic machine and the resistance value of the resistance included in the different apparatus, and multiple parameters can be controlled.

The detecting section may detect one state from multiple states based on the division ratio between the resistance included in the electronic machine and the resistance in the different apparatus and detect the apparatus connected to the connector based on the detected state. Under this construction, the detecting section detects one state from multiple states based on the division ratio with the resistance included in the different apparatus and detects the apparatus connected to the connector based on the detected state. As a result, based on the division ratio between two resistances, the different apparatus can be identified.

The control by the detecting section may control to select one of an earphone terminal and the connector as the destination of voice output. The control by the detecting section may control the volume of voice. The control by the detecting section may control to determine the input current value to be input from the different apparatus. The control by the detecting section may control to determine whether the different apparatus is a microphone or not.

The electronic machine may further include a display section, and the control by the detecting section may control the display on the display section regarding the ON/OFF of an icon for recording based on the presence of a microphone of the different apparatus.

According to another embodiment of the invention, there is provided a connected machine identifying method for an electronic machine connectable to a different apparatus through a connector, the method including the steps of: connecting a different apparatus to the connector; and detecting one state from multiple states based on the resistance value of a resistance included in the different apparatus connected to the connector and controlling multiple parameters based on the detected one state.

By this method, the connecting step connects a different apparatus to the connector, and the detecting step detects one state from multiple states based on the resistance value of a resistance included in the different apparatus connected to the connector and controls multiple parameters based on the detected one state. As a result, based on the resistance value of the resistance in the electronic machine and the resistance value of the resistance included in the different apparatus, one state is detected from multiple states, and multiple parameters can be controlled.

According to another embodiment of the invention, there is provided a control system for an electronic machine, the system including an electronic machine, and a connected machine connectable to the electronic machine, wherein the electronic machine has a resistance, a connector to be connected to a different apparatus, and a detecting section that detects one state from multiple states based on the resistance value of the resistance and the resistance value of a resistance included in the different apparatus connected to the connector and controls multiple parameters based on the detected one state, and the connected machine has a resistance, and a connector to be connected to the connector of the electronic machine.

Under this construction, the electronic machine includes a resistance, a connector and a detecting section, and the connector is connected to a different apparatus. The detecting section detects one state from multiple states based on the resistance value of the resistance and the resistance value of the resistance included in the different apparatus connected to the connector and controls multiple parameters based on the detected one state. The connected machine includes a resistance and a connector, and the connector is connected to the connector of the electronic machine. As a result, based on the resistance value of the resistance of the electronic machine and the resistance value of the resistance of the connected machine, the electronic machine can detect one state from multiple states and control multiple parameters.

As described above, according to the embodiments of the invention, an invent and improved electronic machine, connected machine identifying method and control system can be provided which can select one of multiple states and, when a different machine is connected thereto, identify the connected machine.

BRIEF DESCRIPTION OF THE DRAWINGS

FIG. 11 is an explanatory diagram describing states of the electronic machine according to the embodiment of an invention;

DESCRIPTION OF THE PREFERRED EMBODIMENTS

Figure 1:
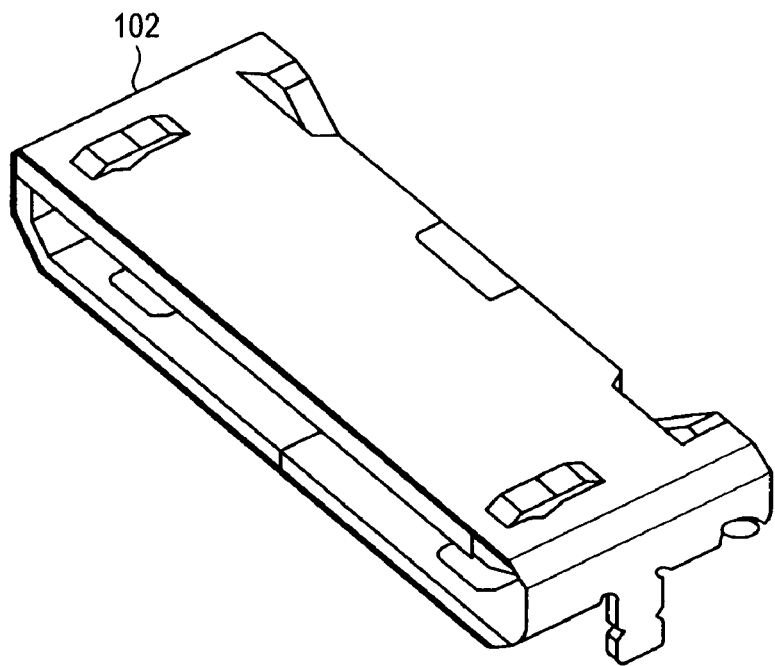
FIG. 1 is a perspective diagram illustrating the form of a connector of an electronic machine according to an embodiment of the invention.

With reference to the attached drawings, preferred embodiments of the invention will be described in detail below. In the specification and drawings, identical reference numerals are given to components substantially having identical functional constructions, and repetitive explanation thereon will be omitted herein.

First of all, the form of a connector of an electronic machine according to an embodiment of the invention will be described. The electronic machine according to the embodiment of the invention is configured to be connectable with a different machine through a connector, such as a portable music player.

Figure 2:
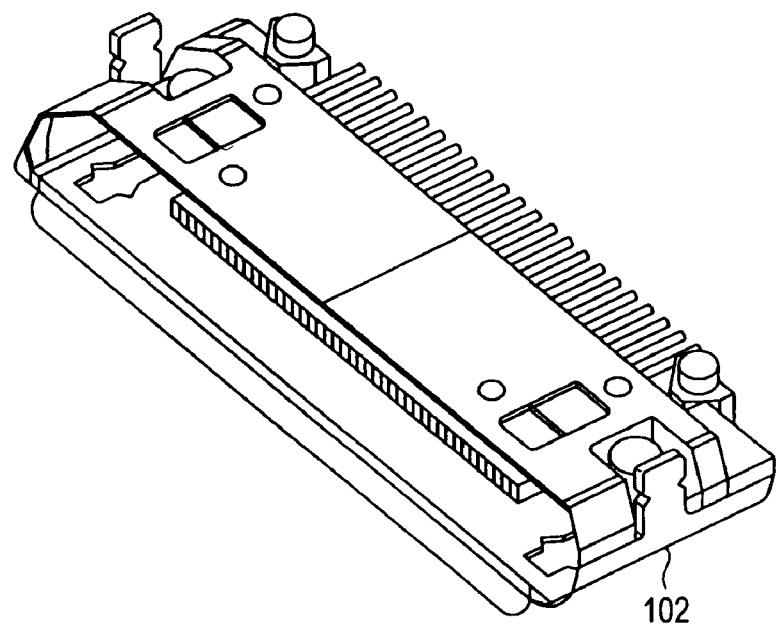
FIG. 2 is a perspective diagram illustrating the form of the connector of an electronic machine according to the embodiment of the invention.
Figure 3:
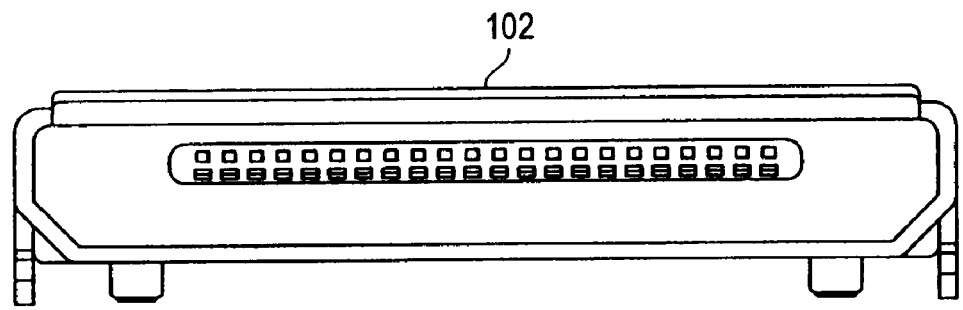
FIG. 3 is an explanatory diagram for describing the connector part of the connector of an electronic machine according to the embodiment of the invention.

FIGS. 1 to 3 are explanatory diagrams for describing the form of the connector of the electronic machine according to the embodiment of the invention. With reference to FIGS. 1 to 3, the form of the connector of the electronic machine according to an embodiment of the invention will be described below.

FIG. 1 is a front perspective view illustrating the form of the connector of the electronic machine according to an embodiment of the invention. FIG. 2 is a back perspective view illustrating the form of the connector of the embodiment of the invention. FIG. 3 is a front view for describing the connector part of the connector of the electronic machine according to the embodiment of the invention.

As shown in FIGS. 1 to 3, a connector 102 of the electronic machine according to the embodiment of the invention has twenty two pins and is configured to be connectable with a different machine.

The form of the connector of the electronic machine according to the embodiment of the invention has been described above. Next, the form of a connector of an accessory connectable to the electronic machine according to the embodiment of the invention will be described.

Figure 4:
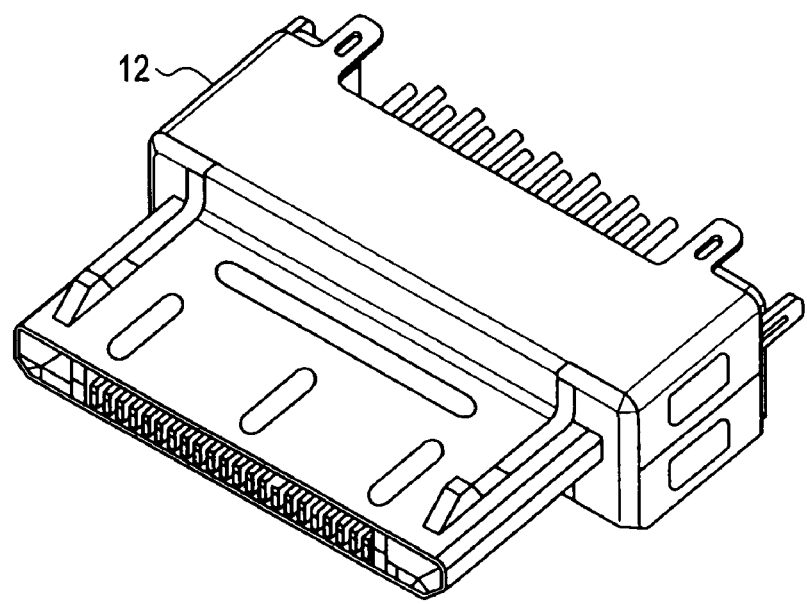
FIG. 4 is a perspective diagram illustrating the form of a connector of an accessory according to an embodiment.
Figure 5:
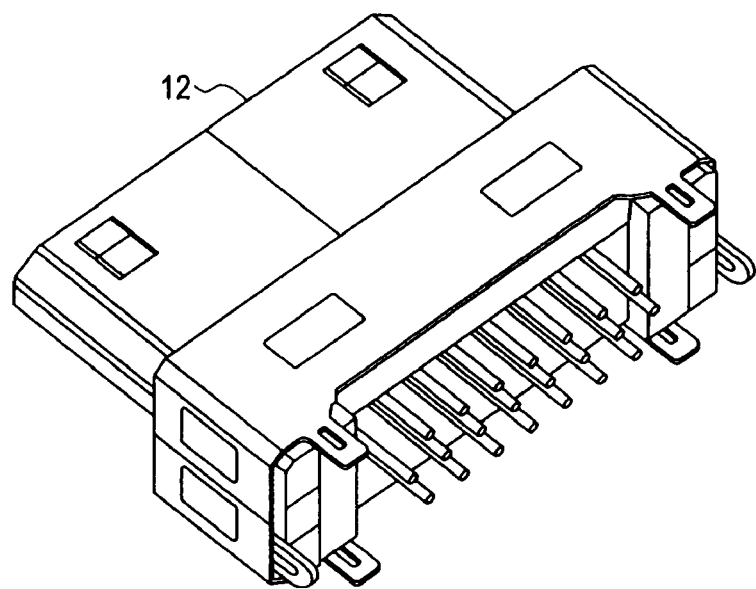
FIG. 5 is a perspective diagram illustrating the form of a connector of an accessory according to the embodiment.
Figure 6:
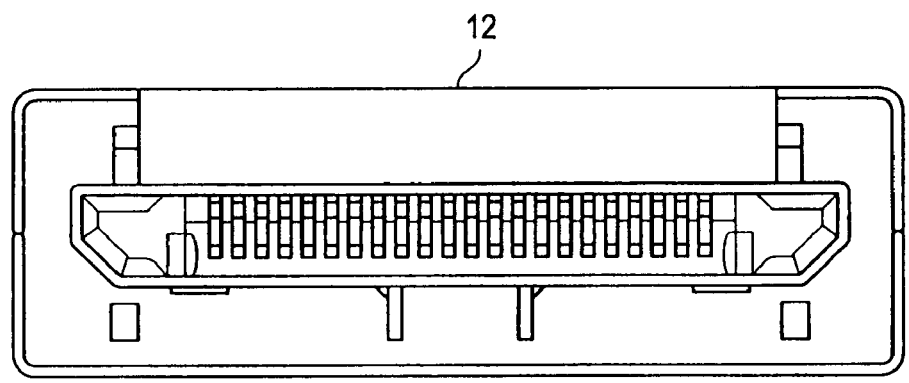
FIG. 6 is an explanatory diagram for describing the connector part of the connector of an accessory according to the embodiment of the invention.

FIGS. 4 to 6 are explanatory diagrams illustrating the form of the connector of an accessory according to an embodiment of the invention. With reference to FIGS. 4 to 6, the form of the connector of an accessory according to an embodiment of the invention will be described below.

FIG. 4 is a front perspective view illustrating the form of the connector of an accessory according to an embodiment of the invention. FIG. 5 is a back perspective view illustrating the form of the connector of an accessory according to the embodiment of the invention. FIG. 6 is a front view of the connector for describing the connector part of the connector of an accessory according to the embodiment of the invention.

As shown in FIGS. 4 to 6, a connector 12 according to an embodiment of the invention has twenty two pins. The connector 12 is configured to be connectable with the connector 102 of the electronic machine as shown in FIGS. 1 to 3. Therefore, the machine having the connector as shown in FIGS. 4 to 6 is connectable with the connector 102 of all electronic machines.

The form of the connector of an accessory according to an embodiment of the invention has been described above. Next, the construction of the electronic machine according to an embodiment of the invention will be described.

Figure 7:
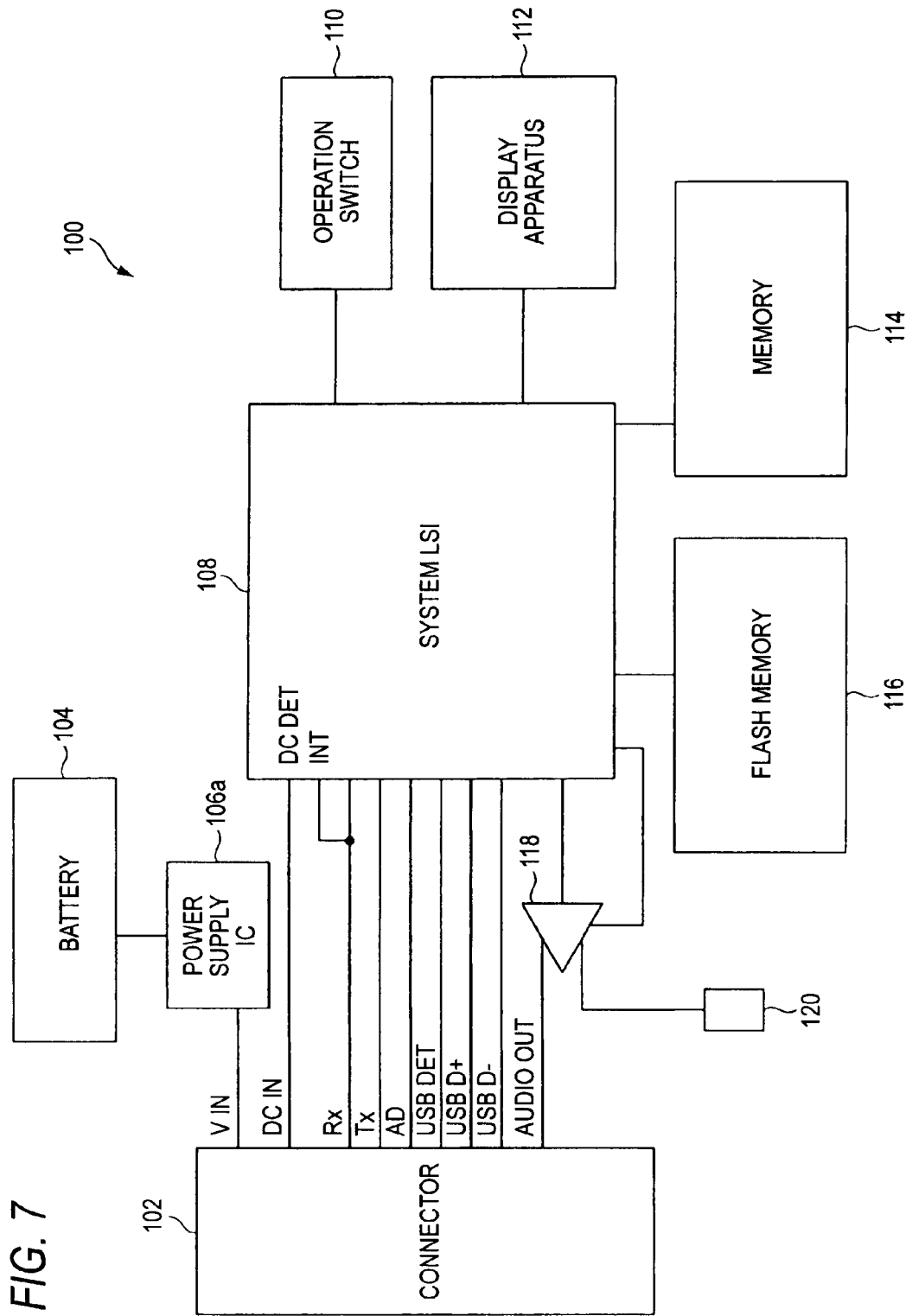
FIG. 7 is an explanatory diagram for describing the block construction of the electronic machine according to an embodiment of the invention.
Figure 8:
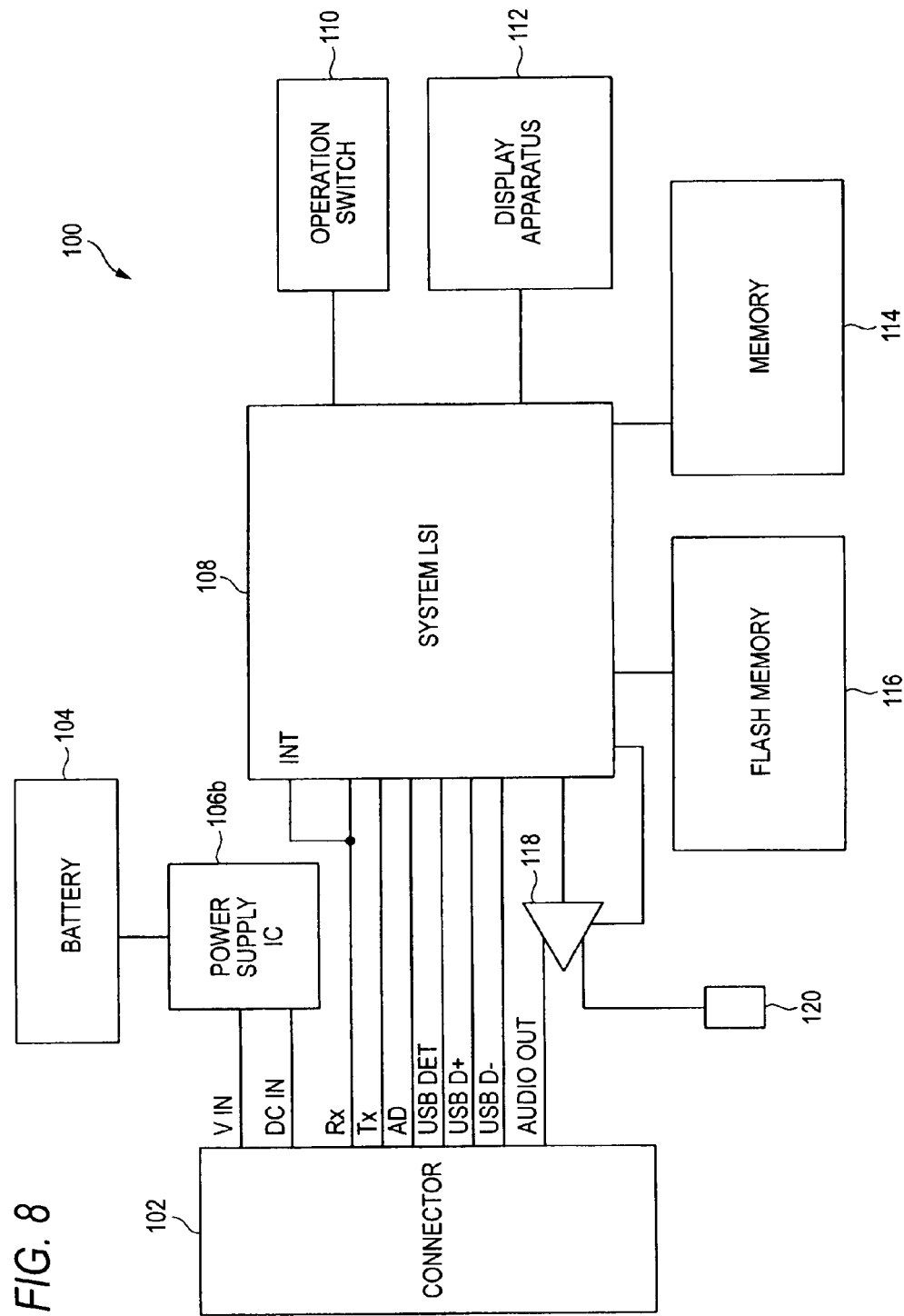
FIG. 8 is an explanatory diagram for describing the block construction of the electronic machine according to an embodiment of the invention.

FIGS. 7 and 8 are explanatory diagrams describing block constructions of the electronic machine according to an embodiment of the invention. With reference to FIGS. 7 and 8, the block constructions of the electronic machine according to an embodiment of the invention will be described below.

As shown in FIG. 7, an electronic machine 100 according to an embodiment of the invention includes the connector 102, a battery 104, a power supply IC 106a, a system LSI 108, an operation switch 110, a display device 112, a memory 114, a flash memory 116, a selector 118, and a headphone jack 120.

The connector 102 connects to a different machine. The connector 102 has twenty two pins as shown in FIGS. 1 to 3. The twenty two pins have respectively different roles.

In the electronic machine 100 according to an embodiment of the invention, the twenty two pins have respectively different roles. Pin #1 is connected to the ground. Pin #2 is kept in reserve. Pins #3 and #4 have roles as digital input/output for USB (Universal Serial Bus) communication. Pin #3 has an input/output function of the D+ signal line of USB, and Pin #4 has an input/output function of the D− signal line of USB. Pin #5 is connected to the ground. Pin #6 is kept in reserve. Pin #7 has a role of input/output of power supply and has a function for power supply to the body. Pin #8 has a role of digital input and has a function of receiving a receive signal (RxD) and a WAKE signal in a UART (Universal Asynchronous Receiver/Transmitter). Pin #9 has a role of analog input. Through Pin #9, the device connecting to the connector is identifiable. Pin #10 has a role of digital input and has a function of transmitting a transmit (TxD) signal and a SLEEP signal in an UART. Pin #11 has a role of digital input and has a function of receiving a detection signal of USB connection. Pin #12 has a role of power supply output and a function of supplying power to an accessory when the accessory connected to the connector is a machine that may require power supply. Pin #13 has a role of analog input and has a function of input of the left channel for voice. Pin #14 has a role of analog output and has a function of output of the left channel for voice. Pin #15 is connected to the ground for voice. Pin #16 has a role of analog input and has a function of input of the right channel for voice. Pin #17 has a role of analog output and has a function of output of the right channel for voice. Pin #18 is connected to the ground for video. Pin #19 has a function of analog input/output and has a function of input/output of video signals. Pin #20 has a role of power supply input and has a function of power supply to the body. Pin #21 has a role of digital output and has a function of outputting a signal compliant with the SPDIF (Sony Philips Digital InterFace) standard. Pin #22 is connected to the ground.

These pin constructions are examples of the invention, and the set of the positions of the pins and functions that the pins have is not limited to the above.

For convenience, nine signal lines including V IN (Pin #7 for power supply input), DC IN (Pin #20 for power supply input), Rx (Pin #8 for digital input) Tx (Pin #10 for digital output), AD (Pin #9 for analog input), USB DET (Pin #11 for digital input), USB D+ (Pin #3 for digital input), USB D− (Pin #4 for digital input), and Audio OUT (Pin #14 and Pin #17 for analog output) are extracted from twenty two signal lines connecting to the connector 102 and shown in the block construction of the electronic machine 100 shown in FIG. 7. The other signal lines, not shown in FIG. 7, are also connected to the connector 102.

The battery 104 supplies power to the components of the electronic machine 100. With the power supply from the battery 104, the electronic machine 100 operates even without a plugged power supply. The battery 104 is charged by external power supply through the power supply IC 106a. In the electronic machine shown in FIG. 7, the power supply IC 106a is a power supply IC with one power supply channel.

The system LSI 108 controls the components of the electronic machine 100. The system LSI 108 may include a microprocessor that performs computing processing and/or a chip that performs voice/video processing. According to this embodiment, the system LSI includes a CPU (Central Processing Unit).

The operation switch 110 is for operating the electronic machine 100. The operation switch 110 may include a power supply switch and a switch or button for selecting a function of the electronic machine 100 and/or adjusting the volume.

The display device 112 displays the state of the electronic machine 100. As the state of the electronic machine 100, the tune name, singer name and/or volume of the tune being played may be displayed. Alternatively, an icon indicating a function of the electronic machine 100 may be displayed.

The memory 114 stores data and/or a computer program. According to this embodiment, the memory 114 is a storage medium that stores a computer program for controlling the electronic machine 100. The computer program is loaded from the memory 114 and is executed in the system LSI 108, whereby a function of the electronic machine 100 is implemented.

The flash memory 116 is a memory to/from which data can be written/deleted freely and stores music data and/or moving picture data of a tune in the electronic machine 100, for example, according to this embodiment. By loading voice data or moving picture data of a tune saved in the flash memory 116, a user can enjoy a music tune and/or a moving image on the electronic machine 100.

The selector 118 is used for selecting the destination of voice output. As the destination of voice output, one or both of the connector 102 and headphone jack 120 can be selected. According to this embodiment, one of the connector 102 and headphone jack 120 is selected as the destination of voice output. The selector 118 may be a switching element, and the switching element may be a MOSFET (Metal Oxide Semiconductor Field Effect Transistor), for example.

The headphone jack 120 outputs voice, and a user can listen to voice through a headphone or an earphone by connecting the terminal of the headphone or earphone to the headphone jack.

FIG. 7 illustrates the construction of the electronic machine 100 including the power supply IC 106a having one power supply channel. The power supply IC may be two power supply channels. FIG. 8 is an explanatory diagram illustrating a change example of the electronic machine 100 according to an embodiment of the invention. The electronic machine 100 shown in FIG. 8 is different from the one in FIG. 7 only in a power supply IC. In the electronic machine 100 shown in FIG. 8, a power supply IC 106b with two power supply channels is used as the power supply IC.

The block construction of the electronic machine according to the embodiment of the invention has been described above. Next, a connected machine identifying method for an electronic machine according to an embodiment of the invention will be described.

Figure 9:
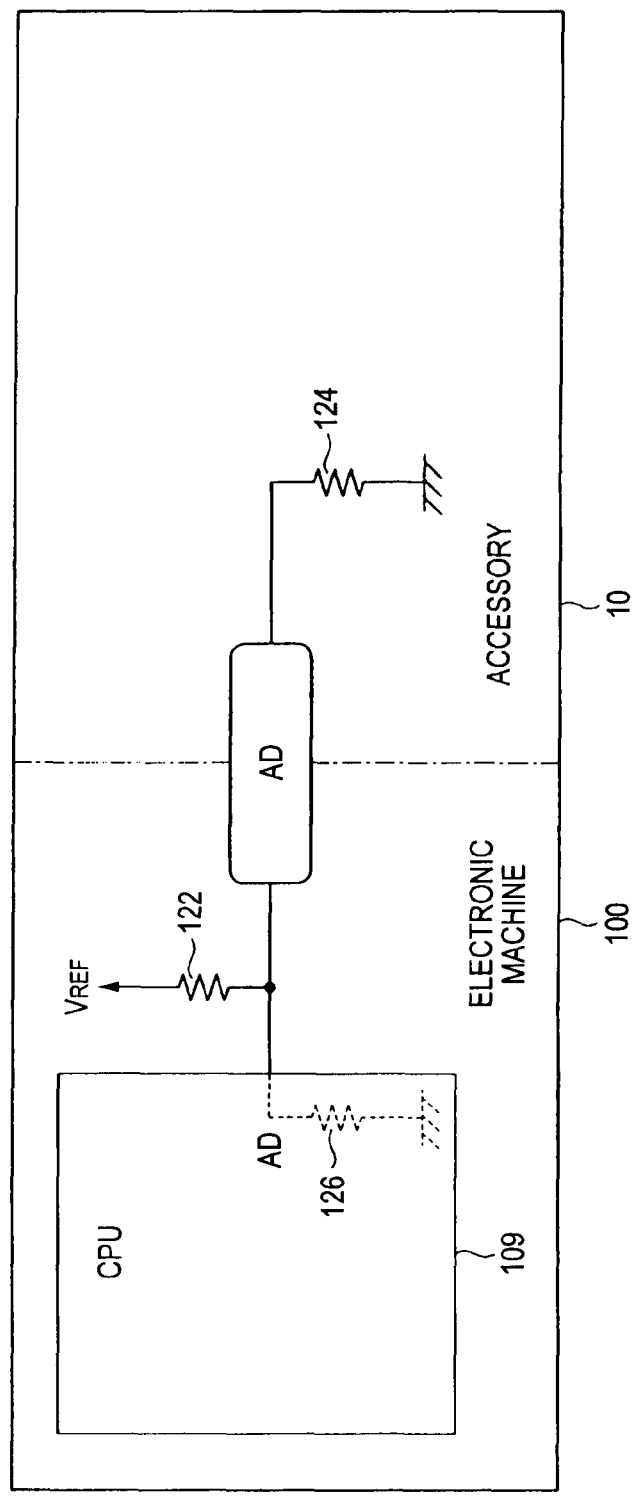
FIG. 9 is an explanatory diagram for schematically describing the connection between the electronic machine and an accessory in identifying a connected machine according to an embodiment of the invention.
Figure 10:
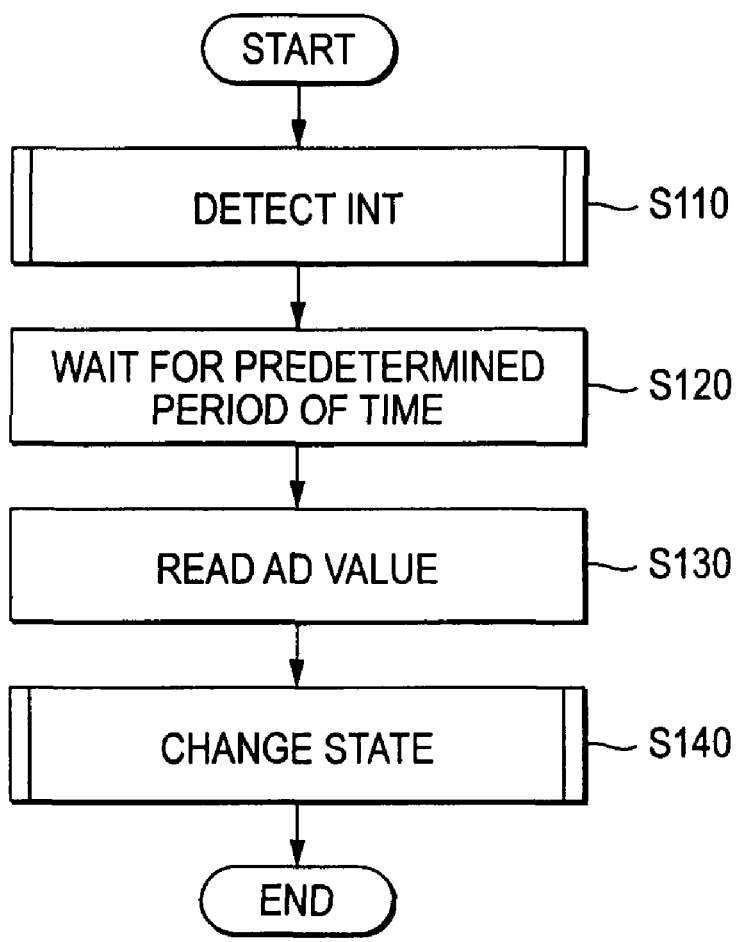
FIG. 10 is a flowchart describing a connected machine identifying method according to the embodiment of the invention.

FIG. 9 is an explanatory diagram schematically describing the connection between an electronic machine and an accessory in identifying a connected machine according to an embodiment of the invention. FIG. 10 is a flowchart describing the connected machine identifying method according to the embodiment of the invention. With reference to FIGS. 9 and 10, the connected machine identification between an electronic machine and an accessory according to an embodiment of the invention will be described below.

As shown in FIG. 9, the electronic machine according to an embodiment of the invention identifies the accessory connected to the connector 102 based on the signal line connected to the AD port in the connector 102.

The electronic machine side connects to the reference voltage VREF of the AD port through a resistance 122. A signal line extends from the AD port to the system LSI 108, and a resistance 126 is provided on the signal line from the AD port within the system LSI 108. On the other hand, the accessory side is pulled down to the ground by using a resistance 124. Here, by changing the resistance value of the resistance 124 used in the accessory side based on the type of the connected accessory, the electronic machine 100 can identify the machine connected to the connector.

More specifically, the potential based on the resistance division ratio between the resistance 122 in the electronic machine side and the resistance 124 in the accessory side is read by AD conversion. Then, the accessory connected to the connector of the electronic machine 100 is identified based on the value of the potential read by the AD conversion.

With reference to FIG. 10, a connected machine identifying method for an electronic machine according to the embodiment of the invention will be described. First of all, after a connector 12 of an accessory is connected to the connector 102 of the electronic machine 100, the system LSI 108 of the electronic machine 100 detects, through a CPU 109, INT (an interrupt by a rising edge of RxD) based on a transmit signal through the RXD port of the connector (step S110). After the detection of INT, the processing waits for a predetermined period of time until a stable value of the potential can be obtained before reading the potential by AD conversion (step S120). After waiting for a predetermined period of time, the value of the potential based on the resistance division ratio between the resistance 122 in the electronic machine side and the resistance 124 in the accessory side is read by AD conversion (step S130). Then, the state of the electronic machine 100 is changed in accordance with the potential value obtained by reading through AD conversion (step S140).

In this way, only by providing a resistance to the connector of an accessory, the potential value based on the resistance division ratio can be read in the electronic machine, and the internal state of the electronic machine can be changed in accordance with the potential value.

FIG. 11 is an explanatory diagram describing a list of states of an electronic machine according to an embodiment of the invention. According to the embodiment, twelve patterns are prepared based on the resistance division ratios, and correspondences are established between potential values read by step S130 above and the patterns, respectively. With reference to FIG. 11, the states of an electronic machine according to an embodiment of the invention will be described below.

Pattern 1 describes that voice is output to the headphone jack (HPJ) 120 and the volume is adjustable (Variable) in the electronic machine 100 and that the permissible current of the power to be supplied from the power supply terminal (DCIN) is 500 mA and the machine is a peripheral machine (Internal) without voice input to the connector (which makes an internal microphone usable if any internal microphone is provided in the electronic machine). The machine corresponding to Pattern 1 may be a dry cell adapter for operating the electronic machine 100 by receiving the supply of power from a dry cell, for example.

Pattern 2 describes that voice is output to the connector 102 and the volume is fixed (Fixed, where the volume is fixed to a maximum output and is not adjustable in the electronic machine 100) and that the permissible current of the power to be supplied from the power supply terminal (DCIN) is 800 mA and the machine is a peripheral machine without voice input to the connector (which makes an internal microphone usable if any internal microphone is provided in the electronic machine). The machine corresponding to Pattern 2 may be an external speaker outputting sound of a tune played by the electronic machine 100, for example.

Pattern 3 describes that voice is output to the connector 102 and the volume is adjustable in the electronic machine 100 and that the permissible current of the power to be supplied from the power supply terminal (DCIN) is 800 mA and the machine is a peripheral machine without voice input to the connector (which makes an internal microphone usable if any internal microphone is provided in the electronic machine). The machine corresponding to Pattern 3 may be a remote controller for controlling the electronic machine 100, for example.

Pattern 4 describes that voice is output to the connector 102 and the volume is adjustable in the electronic machine 100 and that the permissible current of the power to be supplied from the power supply terminal (DCIN) is 800 mA and the machine is a peripheral machine (External) with voice input to the connector (which makes an internal microphone unusable if any internal microphone is provided in the electronic machine).

Pattern 5 describes that voice is output to the connector 102 and the volume is fixed (where the volume is fixed to a maximum output and is not adjustable in the electronic machine 100) and that the permissible current of the power to be supplied from the power supply terminal (DCIN) is 800 mA and the machine is a peripheral machine with voice input to the connector (which makes an internal microphone unusable if any internal microphone is provided in the electronic machine). The machine corresponding to Pattern 5 may be a cradle having a recording function, for example.

Pattern 6 describes that voice is output to the connector 102 and the volume is adjustable in the electronic machine 100 and that the permissible current of the power to be supplied from the power supply terminal (DCIN) is 500 mA and the machine is a peripheral machine without voice input to the connector (which makes an internal microphone usable if any internal microphone is provided in the electronic machine).

Pattern 7 describes that voice is output to the connector 102 and the volume is fixed (where the volume is fixed to a maximum output and is not adjustable in the electronic machine 100) and that the permissible current of the power to be supplied from the power supply terminal (DCIN) is 500 mA and the machine is a peripheral machine with voice input to the connector (which makes an internal microphone unusable if any internal microphone is provided in the electronic machine).

Pattern 8 describes that voice is output to the headphone jack 120 and the volume is adjustable in the electronic machine 100 and that the permissible current of the power to be supplied from the power supply terminal (DCIN) is 500 mA and the machine is a peripheral machine with voice input to the connector (which makes an internal microphone unusable if any internal microphone is provided in the electronic machine).

Pattern 9 describes that voice is output to the connector 102 and the volume is adjustable in the electronic machine 100 and that the permissible current of the power to be supplied from the power supply terminal (DCIN) is 500 mA and the machine is a peripheral machine with voice input to the connector (which makes an internal microphone unusable if any internal microphone is provided in the electronic machine).

Pattern 10 describes that voice is output to the headphone jack 120 and the volume is adjustable in the electronic machine 100 and that the permissible current of the power to be supplied from the power supply terminal (DCIN) is 800 mA and the machine is a peripheral machine with voice input to the connector (which makes an internal microphone unusable if any internal microphone is provided in the electronic machine). The machine corresponding to Pattern 10 may be an external microphone or an externally input recording adapter for recording, for example.

Pattern 11 describes that voice is output to the connector 102 and the volume is fixed (where the volume is fixed to a maximum output and is not adjustable in the electronic machine 100) and that the permissible current of the power to be supplied from the power supply terminal (DCIN) is 500 mA and the machine is a peripheral machine with voice input to the connector (which makes an internal microphone unusable if any internal microphone is provided in the electronic machine).

Pattern 12 describes that voice is output to the headphone jack 120 and the volume is adjustable in the electronic machine 100 and that the permissible current of the power to be supplied from the power supply terminal (DCIN) is 800 mA and the machine is a peripheral machine without voice input to the connector (which makes an internal microphone usable if any internal microphone is provided in the electronic machine). The machine corresponding to Pattern 12 may be an AC adapter that supplies power to the electronic machine 100, for example.

In the electronic machine 100, the indication of the volume may not be displayed on the display section and/or a beep sound in accordance with the operation on an operation switch may not be output if the volume is fixed, that is, if the volume is fixed to a maximum output in the electronic machine 100 and is not adjustable in the electronic machine 100 in each of the patterns.

Then, when the accessory 10 is removed from the connector 102, the behavior of the electronic machine 100 is returned to the state with nothing connected to the connector 102 (default state).

In this way, providing a resistance in a connector part of an accessory for changing the state of the electronic machine in accordance with the division ratio between the resistances of the electronic machine and the accessory allows the detection of the identity of the accessory connected to the connector through one port only in the body side of the electronic machine. Advantageously, no extra circuit is necessary in the electronic machine side for detecting the accessory, which greatly contributes to decreases in size and/or costs of the electronic machine. Furthermore, no extra part is necessary in the accessory side, excluding a resistance for detecting the accessory, which minimizes the size and/or costs for manufacturing the accessory.

Having described the states of the electronic machine according to an embodiment of the invention with reference to FIG. 11, the number of patterns of the states of the electronic machine and the combinations of the states in the invention are not apparently limited to the examples shown in FIG. 11. While the volume for output in the embodiment is fixed to a maximum volume in the electronic machine 100 side if the volume is fixed, the volume for output in the electronic machine is not limited to a maximum according to the invention.

The connected machine identifying method for an electronic machine according to an embodiment of the invention has been described above. Next, a connection state detecting method for an electronic machine according to an embodiment of the invention will be described.

In an electronic machine to which an accessory is connectable, the state of the electronic machine is necessary to return to a default state with nothing connected when an accessory connected to a connector of the electronic machine is removed. For this reason, the electronic machine side may require a system that quickly detects the state an accessory is removed from the connector. The detecting system may greatly contribute to decreases in size and/or costs of the body of the electronic machine by decreasing the number/numbers of the circuit structures, pins and/or ports.

Then, an electronic machine and connection state detecting method will be described that detect the state that an accessory is removed from a connector thereof by using two ports only.

Figure 12:
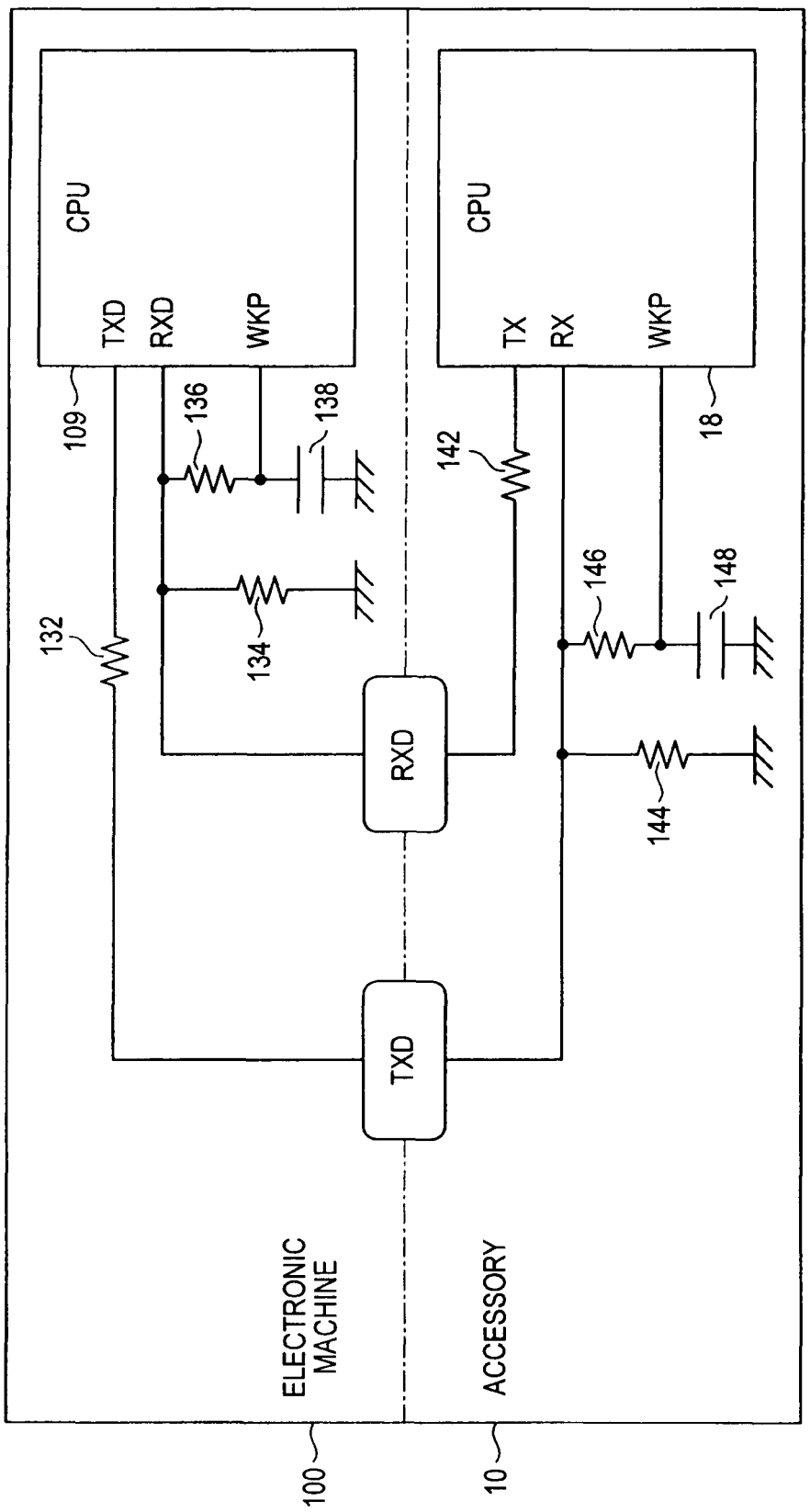
FIG. 12 is an explanatory diagram describing a connection example between the electronic machine and an accessory in detecting the connection state according to an embodiment of the invention.
Figure 13:
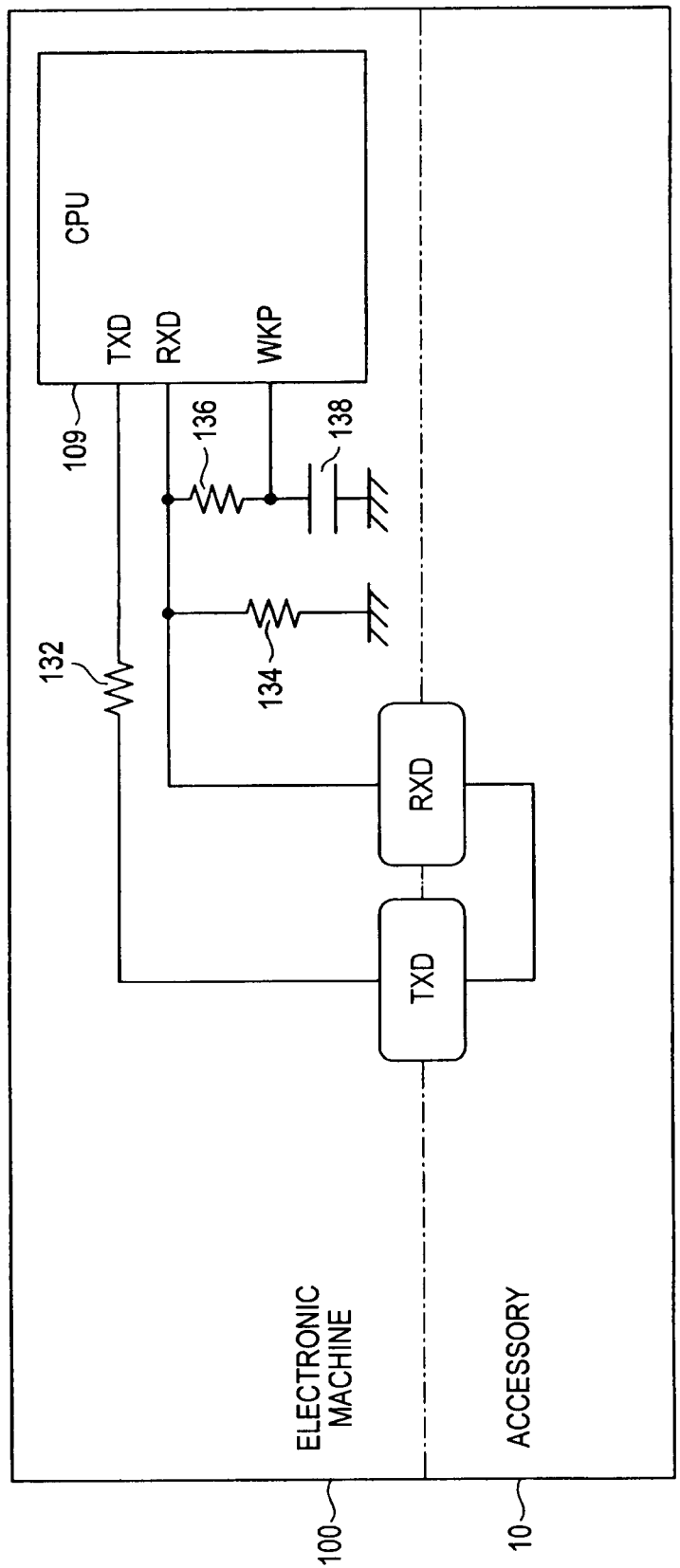
FIG. 13 is an explanatory diagram describing a connection example between the electronic machine and an accessory in detecting the connection state according to an embodiment of the invention.

FIGS. 12 and 13 are explanatory diagram describing examples of the connection between the electronic machine and an accessory in detecting a connection state according to an embodiment of the invention. With reference to FIGS. 12 and 13, examples of the connection between the electronic machine and an accessory according to an embodiment of the invention will be described below.

FIG. 12 shows an example of the connection where a CPU is provided in both electronic machine and accessory, and FIG. 13 shows an example of the connection where a CPU is provided in the electronic machine only. An example of the accessory having a CPU may be a cradle that charges the electronic machine or a remote controller that controls the electronic machine. An example of the accessory without a CPU may be a headphone.

In the construction shown in FIG. 12, an electronic machine and an accessory are connected through a TxD port and an RxD port, and the TxD of the CPU 109 of the electronic machine 100 is connected to the Rx of a CPU 18 in the accessory through the TxD port. The RxD of the CPU 109 in the electronic machine is connected to the Tx of the CPU 18 in the accessory through the RxD port. In the electronic machine 100, a resistance 132 is serially provided at the middle of the signal line between the CPU 109 and the TxD port of the connector. Resistances 134 and 136 and a capacitor 138 are connected in parallel at the middle of the signal line between the CPU 109 and the RxD port of the connector. Similarly, also in the accessory side, a resistance 142 is provided at the middle of the signal line between the CPU 18 and the RxD port of the connector, and resistances 144 and 146 and a capacitor 148 are connected in parallel at the middle of the signal line between the CPU 18 and the TxD port of the connector.

The resistance 134 in the electronic machine 100 is connected to the ground. Under a condition that no accessory is connected to the connector, the RxD of the CPU 109 is configured to have LOW state (pull-down) because of the resistance 134. The resistance 136 and capacitor 138 cause to occur a wakeup interrupt at the rising edge of the RxD. When the electronic machine 100 has a sleep state, the wakeup interrupt wakes up the electronic machine 100 and exits the sleep state, which allows serial communication. The AD value is read by the AD port when the electronic machine 100 wakes up, and the connected machine is identified. As a result of the identification, the state of the electronic machine 100 is defined to a proper state. After the state of the electronic machine 100 is defined to a proper state, the wakeup interrupt at the rising edge of the RxD is inhibited to receive. The expression, "sleep state", here refers to a state that the electronic machine 100 hardly consumes the power without operating.

Like the resistance 134 in the electronic machine 100, the resistance 144 in the accessory 10 is also connected to the ground, and the RxD of the CPU 18 is configured to have LOW state under a state that the electronic machine 100 is not connected to the connector. In order to turn the accessory 10 to a sleep state, a LOW signal is output from the CPU 109 to the TxD port. In order to exit the sleep state by the accessory 10, a HI signal is output from the CPU 109. The resistance 146 and capacitor 148 cause to occur a wakeup interrupt at the rising edge of the RxD. In a sleep state, the accessory 10 exits the sleep state based on the wakeup interrupt, which allows serial communication.

In order to wake up the electronic machine 100 from the accessory 10, a HI signal is output from the TX of the CPU 18 to the RxD port in the accessory 10. The electronic machine 100 detects the HI signal from the accessory 10 and wakes up from the sleep state. In order to cause the electronic machine 100 to have a sleep state from the accessory 10, a LOW signal or Hi-Z (high impedance) is output from the TX to the RxD port of the CPU 18 in the accessory 10. The LOW signal or Hi-Z output causes the pull-down in the resistance 134 in the electronic machine 100, and the electronic machine 100 is turned to the sleep state.

Having illustrated in FIG. 12 the connection example in which a CPU is provided in both electronic machine and accessory, an accessory to be connected to an electronic machine may have a simple construction without a CPU, such as a headphone. FIG. 13 is an explanatory diagram illustrating an example of the connection between such an accessory without a CPU and an electronic machine. In order to connect to an accessory without a CPU, the TxD port and RxD port are directly connected.

The connection between an electronic machine and an accessory according to an embodiment of the invention has been described above. Next, a connection state detecting method for an electronic machine according to an embodiment of the invention will be described.

Figure 14:
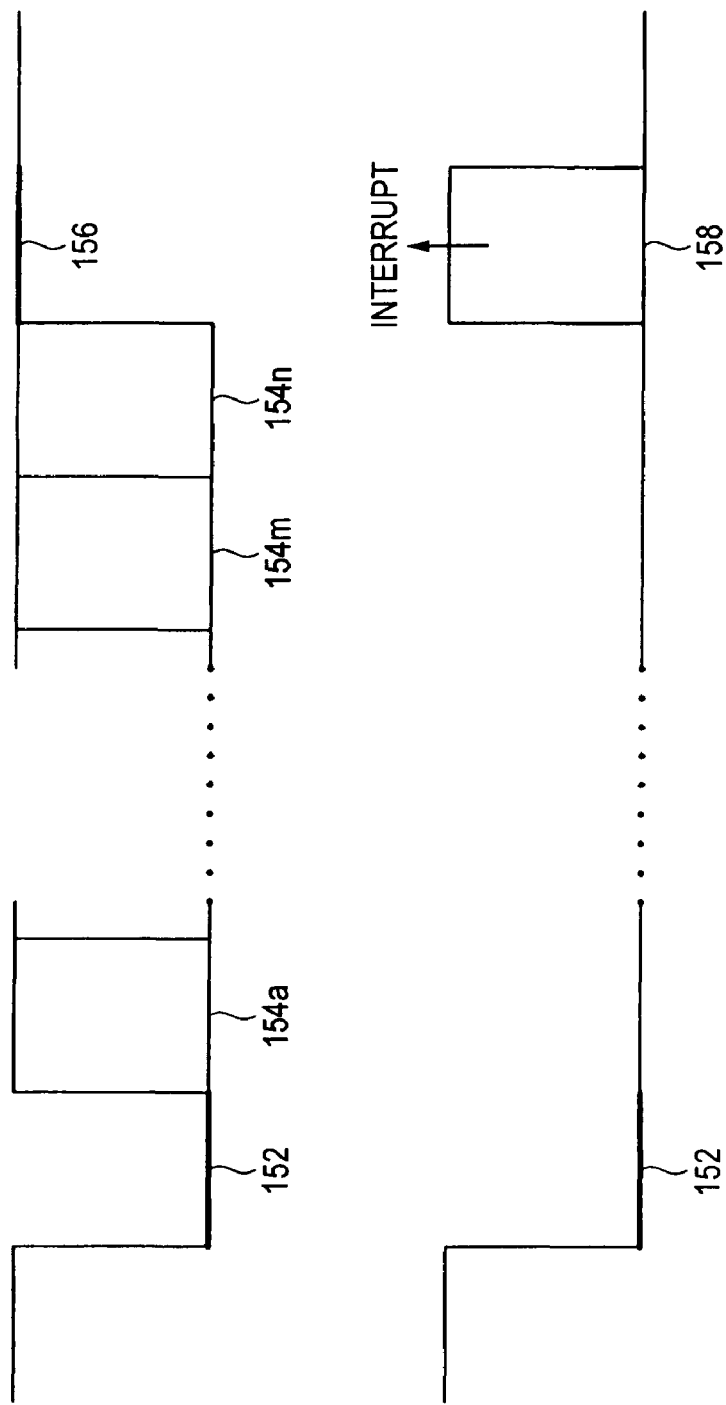
FIGS. 14A and 14B are explanatory diagrams describing an example of the data string of UART to be used for the detection of the connection state of the electronic machine.

FIGS. 14A and 14B are explanatory diagrams describing an example of the data string of UART (Universal Asynchronous Receiver/Transmitter) to be used for the detection of a connection state of an electronic machine. FIG. 14A is an explanatory diagram describing an example of the data string in general UART. As shown in FIG. 14A, in UART, a start bit 152 is provided at the beginning of one data string, and a predetermined number of bits 154a, . . . , 154m and 154n are added subsequently to the start bit 152. Then, a stop bit 156 is typically provided at the last of one data string. The stop bit 165 includes one bit or multiple bits. The value of the stop bit 156 is typically 1 (HI). In the data communication in UART, whether one data string can be received properly or not could be determined based on the presence of the stop bit 156 corresponding to the start bit 152 in the data string.

However, the data string subject to disconnection does not have the stop bit. In this case, an error interrupt (stop bit error) occurs. According to an embodiment of the invention, based on the detection of the error interrupt, whether the electronic machine has been disconnected or not can be determined by using two pins only to be used for communication.

FIG. 14B is an explanatory diagram illustrating an example of the data string in a case where communication is disconnected during the transfer of one data string and the stop bit is not detected. In the data string as shown in FIG. 14B, the start bit 152 is first transmitted but the stop bit to be transmitted is not transmitted upon disconnection of the communication when an accessory is removed from the connector. As a result the error interrupt (stop bit error) 158 occurs. Based on the detection of the error interrupt, the electronic machine can determine whether an accessory is removed from the connector or not. The connection state detecting method for an electronic machine by using an interrupt signal in UART will be described further in detail below.

Figure 15:
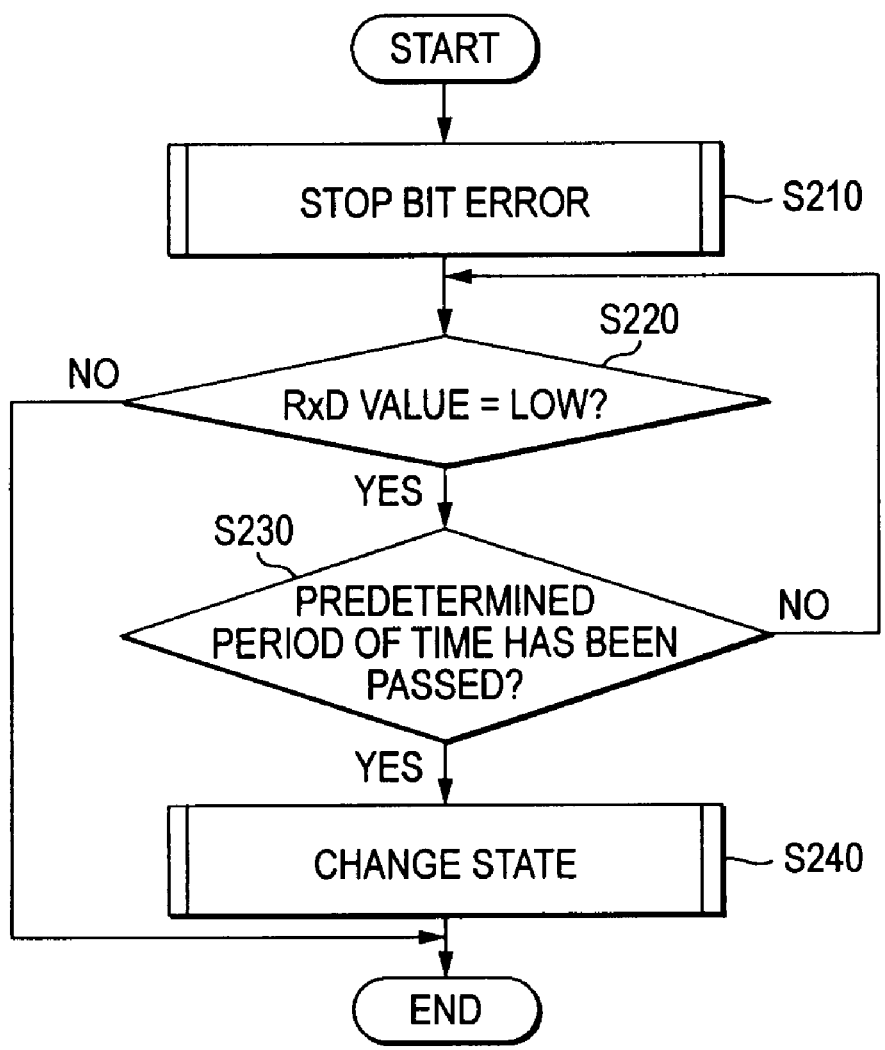
FIG. 15 is a flowchart describing a connection state detecting method for an electronic machine according to an embodiment of the invention.

FIG. 15 is a flowchart describing a connection state detecting method for an electronic machine according to an embodiment of the invention. With reference to FIG. 15, a connection state detecting method for an electronic machine according to an embodiment of the invention will be described in detail below.

First, a stop bit error occurs, and an interrupt signal is detected in the CPU 109 (step S210). When the interrupt signal is detected, whether the value of the RxD is LOW or not is determined (step S220). If the value of the RxD is LOW, the processing waits for a predetermined period of time for determining either communication error of serial communication simply or error due to the removal of an accessory from the connector. The predetermined period of time is desirably a period of time as long as 500 milliseconds, for example. Whether the predetermined period of time has been passed or not is determined (step S230). If not, processing moves to the processing of identifying the value of the RxD in step 220 above. If so in step S230, the state of the electronic machine 100 is defined to the state where nothing is connected to the connector.

In a situation when a tune is being played by the electronic machine 100 when an accessory is removed from the connector 102 or when the power supply of the accessory is turned off, the playback of the tune may be stopped or temporarily stopped. This is because the electronic machine connecting to an accessory is desirably turned to a sleep state when the power supply of the accessory side is turned off.

The state that an accessory is disconnected from the connector can be detected when the stop bit error occurs and the interrupt signal occurs by detecting the interrupt signal and determining either simple communication error due to noise or removal of an accessory from the connector that causes the interrupt.

According to the embodiment, whether an accessory is removed from the connector or not is determined based on the passage of a predetermined period of time. However, the determination may be performed not only once but also multiple times in a predetermined period of time. By performing the determination multiple times in a predetermined period of time, whether an interrupt has been caused by a simple communication error caused due to noise or not can be determined more accurately.

The connection state detecting method for an electronic machine is applicable not only to a case where an accessory has a CPU, as shown in FIG. 12, but also to a case where accessory does not have a CPU, as shown in FIG. 13. The separation between the electronic machine and an accessory disconnects the connection between the TxD port and the RxD port and causes the stop bit error and an interrupt. By detecting the interrupt by the CPU 109, whether the accessory has been removed from the connector 102 of the electronic machine 100 or not can be detected even if the accessory does not have a CPU.

As described above, the connection state detecting method for an electronic machine according to an embodiment of the invention allows the detection of whether an accessory has been removed from the connector or not by detecting, through two signal lines only, an interrupt signal that occurs when a reception error of a data string having correspondence between the starting state and the finishing state as in UART, without providing a special circuit that detects the disconnection. The detection of an interrupt minimizes the load on the CPU, and the connection to the connector and the disconnection from the connector can be easily detected even when the accessory is a machine without a microcomputer. The connection state detecting method for an electronic machine according to an embodiment of the invention greatly contributes to the decreases in size and costs of the body of the electronic machine.

The connection state detecting method for an electronic machine according to an embodiment of the invention has been described above. Next, a charging power supply selecting method according to an embodiment of the invention will be described.

A small electronic machine such as a portable music player internally contains a battery for operating the machine. Then, such an electronic machine receives the supply of power from a USB port of a personal computer and supplies power to a power supply IC, whereby, the internal battery can be charged. However, in a case without a personal computer or with a personal computer which however may not be carried to, for example, the place where a user is staying, power may be supplied from an AC adapter instead of the power supply from an USB port.

In this way, in a case where an electronic machine can receive power from two devices, the limiting matters depend on the device that supplies power such as different currents from the power supplies. In such an electronic machine generally, two ports and power supply paths are prepared, and power is supplied from the separate ports. However, in a case where the electronic machine applies a power supply IC with only one channel for input of power supply, a circuit is necessary for identifying the power supply that inputs in the electronic machine side. Therefore, providing the circuit in the electronic machine may increase the manufacturing costs of the electronic machine and increases the size of the circuit. As a result, the size of the entire electronic machine may increase.

On the other hand, in an electronic machine according to an embodiment of the invention, the power supply that inputs can be identified in the accessory side that supplies power to the electronic machine, which can suppress the manufacturing costs and size of the circuit of the electronic machine.

Figure 16:
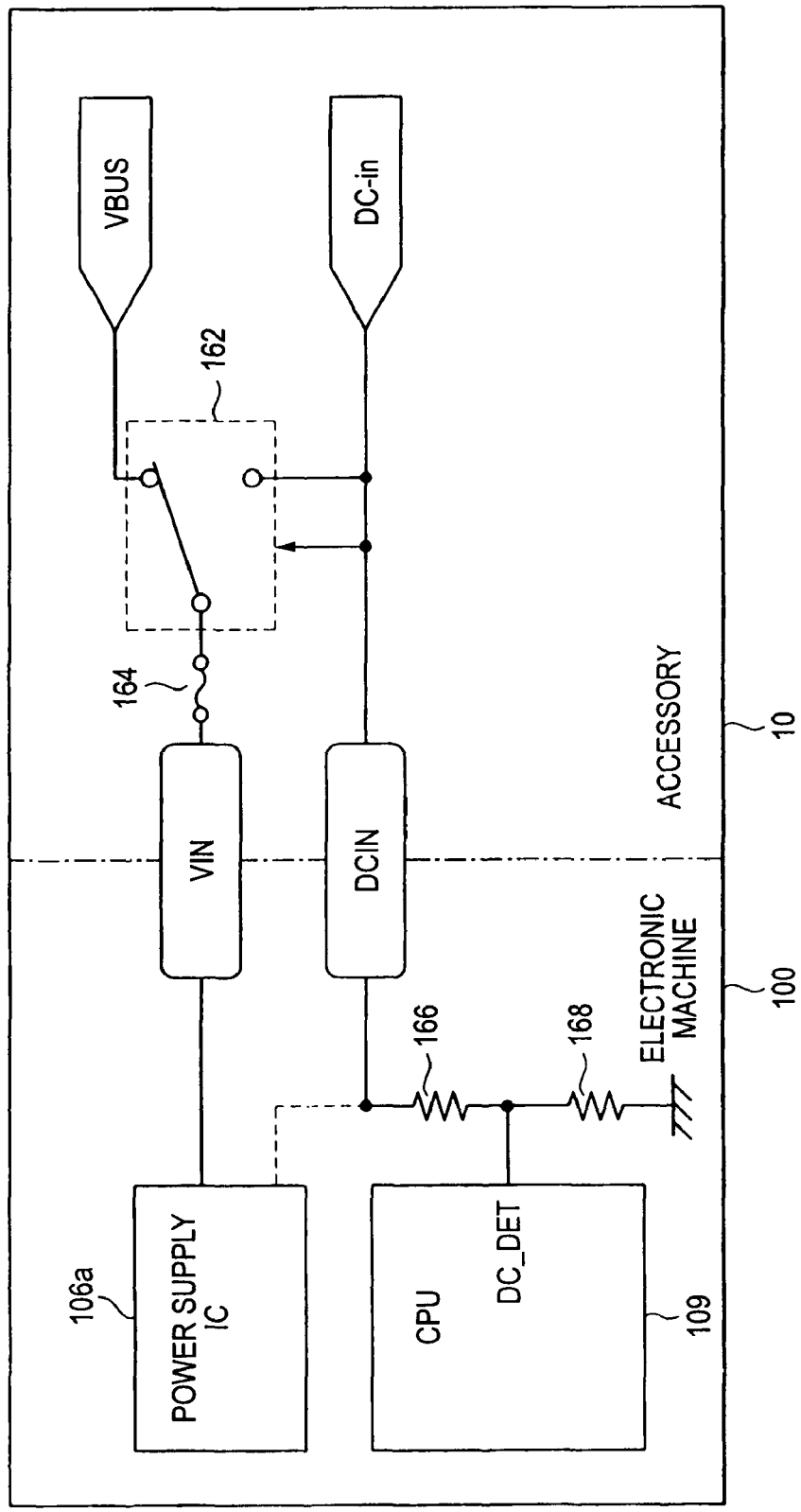
FIG. 16 is an explanatory diagram for describing the connection between an electronic machine and an accessory where the electronic machine is charged according to an embodiment of the invention.

FIG. 16 is an explanatory diagram illustrating the connection between an electronic machine and an accessory while the electronic machine is being charged according to an embodiment of the invention. With reference to FIG. 16, a charging power supply selecting method according to an embodiment of the invention will be described below.

As shown in FIG. 16, the electronic machine 100 and the accessory 10 are connected through the VIN port and DCIN port in order to charge the electronic machine. The accessory 10 shown in FIG. 16 is a machine having both power supply function from a USB and power supply (DC-in) function from a commercial power supply such as an AC adapter and is a machine that can supply power from both of the USB and AC adapter to the electronic machine 100 like a cradle.

Both of the VIN port and DCIN port are ports that supply power from an accessory to an electronic machine. The VIN port supplies power to an electronic machine through a USB. Power is supplied from a VBUS to the power supply IC 106a of the electronic machine 100 through a protective element 164.

On the other hand, the DCIN port receives the supply of DC power from an AC adapter. The input through the DCIN port can be converted in level by the resistance division by the resistances 166 and 168 in the electronic machine 100 side and can be used as a detection signal by being input to the DC_DET port of the CPU 109. In an electronic machine that can supply power to the electronic machine 100 from both USB and AC adapter, like the accessory 10 shown in FIG. 16, power is supplied to the power supply IC 106a of the electronic machine 100 by switching the switch 162 based on the presence of the supply from the DC-in.

Ina case without power supply from the DC-in, for example, without power supply from an AC adapter, the switch 162 is switched to the VBUS side. By switching the switch 162 to the VBUS side, power is supplied from the VBUS to the electronic machine 100.

Once the power supply from the DC-in, for example, the power supply from an AC adapter is started, the switch 162 is switched from the VBUS side to the DC-in side in response to the power supply from the DC-in. Here, an electromagnet, for example, may be used for switching the switch 162. When an electromagnet is used, a magnetic field is caused in the electromagnet by the current from the DC-in, and the magnet field switches the switch 162. Thus, the device that supplies the power can be switched from the USB to the AC adapter, for example, when power is supplied from the DC-in. Then, when the power supply from the DC-in stops due to the unplug of the AC adapter, for example, the switch 162 is switched to the VBUS side, and power can thus be supplied from the USB to the electronic machine 100.

In this way, by switching the device that supplies power in the accessory side where the power supply IC has one channel for supply, the power supply from the USB and the power supply from the AC adapter can be selectively input to the power supply IC of the electronic machine, without the necessity for a circuit for switching between the ports in the electronic machine body side. The elimination of the necessity for the circuit for switching between the ports in the electronic machine body side can greatly contribute to decreases in size and costs of the electronic machine.

Having described this embodiment including the power supply IC 106a with one channel for input as the power supply IC, a power supply IC having two channels for input may be used. In a case where a power supply IC having two channels for input is used, current is input through the VIN port if power is supplied from the USB while current is input through both of the VIN port and the DCIN port if power is supplied from an AC adapter. Having described the embodiment in which an electromagnet is used for switching the switch 162, the invention is not limited thereto. Instead of an electromagnet, a switching device may be used such as a mechanical relay and a photorelay.

Notably, having described the case where power is supplied from the two kinds of USB and AC adapter supply power according to this embodiment, the invention is not limited thereto. Three or more kinds of device may supply power. Having described this embodiment in which the switching between ports is performed in the accessory side, the invention is not limited to the example. The switching between ports may be performed in the electronic machine body side.

The charging power supply selecting method for an electronic machine according to an embodiment of the invention has been described above.

Having described preferred embodiments of the invention above with reference to the attached drawings, it is apparent that the invention is not limited to the examples. It should be understood by those skilled in the art that various modifications, combinations, sub-combinations and alterations may occur depending on design requirements and other factors insofar as they are within the scope of the appended claims or the equivalents thereof.

For example, having assumed a portable music player as the electronic machine in the embodiments for description, the application of the invention is not limited to a portable music player, but the invention is applicable to other electronic machines such as a personal computer, a PDA and a cellular phone.

What is claimed is:

1. An electronic machine connectable to at least one different apparatus, the machine comprising:
    a first resistor having a first resistance value;
    a connector configured to be connected to the at least one different apparatus; and
    a detecting section configured to
        detect a desired state of the electronic machine from multiple states based on a potential value of a division ratio of the first resistance value of the first resistor and a second resistance value of a second resistor, included in the at least one different apparatus, by identifying the at least one different apparatus when the at least one different apparatus is connected to the connector, and
        to control at least one pattern of multiple parameters in the detected desired state based on an association of the at least one pattern of multiple parameters with the multiple states of the electronic machine, wherein
    the association of the at least one pattern with the multiple states is based on the potential values, and
    the multiple parameters include an input DC current value, the DC current flowing between the electronic machine and the at least one different apparatus, and the DC current value being controllably different depending on the at least one different apparatus.

2. The electronic machine according to claim 1, wherein the control by the detecting section controls to select one of an earphone terminal and the connector as the destination of voice output.

3. The electronic machine according to claim 1, wherein the control by the detecting section controls the volume of voice.

4. The electronic machine according to claim 1, wherein the control by the detecting section controls to determine whether the different apparatus is a microphone or not.

5. The electronic machine according to claim 1, further comprising:
    a display section, wherein
    the control by the detecting section controls the display on the display section regarding the ON/OFF of an icon for recording based on the presence of a microphone of the different apparatus.

6. The electronic machine according to claim 1, wherein the association of the at least one pattern of multiple parameters with the multiple states of the electronic machine is stored in the electronic machine in the form of a table.

7. The electronic machine according to claim 1, wherein the detection section detects a connection state of the electronic machine and the at least one different apparatus based on an absence of a stop bit in a data string communicated between electronic machine and the at least one different apparatus after detecting a start bit in the data string.

8. A connected machine identifying method for an electronic machine connectable to at least one different apparatus through a connector, the method comprising:
    connecting the at least one different apparatus to the connector;
    detecting a desired state of the electronic machine from multiple states based on a potential value of a division ratio of a resistance value of a resistor included in the at least one different apparatus by identifying the at least one different apparatus when the at least one different apparatus is connected to the connector;
    controlling at least one pattern of multiple parameters in the detected desired state based on an association of the at least one pattern of multiple parameters with the multiple states of the electronic machine, wherein
    the association of the at least one pattern with the multiple states is based on the potential values, and
    the multiple parameters include an input DC current value, the DC current flowing between the electronic machine and the at least one different apparatus, and the DC current value being controllably different depending on the at least one different apparatus.

9. The connected machine identifying method according to claim 8, further comprising:
    detecting a connection state of the electronic machine and the at least one different apparatus based on an absence of a stop bit in a data string communicated between the electronic machine and the at least one different apparatus after detecting a start bit in the data string.

10. A control system for an electronic machine, the system comprising:
    an electronic machine; and
    at least one connected machine connectable to the electronic machine, wherein the electronic machine includes,
        a first resistor having a first resistance value;
        a first connector configured to be connected to the at least one connected machine; and
        a detecting section configured to
            detect a desired state of the electronic machine from multiple states based on a potential value of a division ratio of the first resistance value of the first resistor and a second resistance value of a second resistor, included in the at least one connected machine, by identifying the at least one connected machine when the at least one connected machine is connected to the first connector, and
            to control at least one pattern of multiple parameters in the detected desired state based on an association of the at least one pattern of multiple parameters with the multiple states of the electronic machine, wherein
        the association of the at least one pattern with the multiple states is based on the potential values, and
        the multiple parameters include an input DC current value, the DC current flowing between the electronic machine and the at least one connected machine, and the DC current value being controllably different depending on the at least one connected machine; and
    the at least one connected machine includes,
        the second resistor having the second resistance value; and
        a second connector to be connected to the first connector of the electronic machine.

11. The control system for an electronic machine according to claim 10, wherein the association of the at least one pattern of multiple parameters with the multiple states of the electronic machine is stored in the electronic machine in the form of a table.

12. The control system for an electronic machine according to claim 10, wherein the detection section detects a connection state of the electronic machine and the at least one different apparatus based on an absence of a stop bit in a data string communicated between electronic machine and the at least one different apparatus after detecting a start bit in the data string.

* * * * *